United States Patent
Artman et al.

(10) Patent No.: US 6,785,140 B2
(45) Date of Patent: Aug. 31, 2004

(54) MULTIPLE HEAT PIPE HEAT SINK

(75) Inventors: Paul T. Artman, Austin, TX (US); Eric Tunks, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/229,515

(22) Filed: Aug. 28, 2002

(65) Prior Publication Data

US 2004/0042169 A1 Mar. 4, 2004

(51) Int. Cl.[7] .............................................. H05K 7/20
(52) U.S. Cl. ..................... 361/709; 361/700; 361/703; 361/711; 165/104.33; 174/15.2
(58) Field of Search ................. 361/683, 687, 361/699, 700; 165/80.3, 80.4, 104.33; 62/259.2; 174/15.2

(56) References Cited

U.S. PATENT DOCUMENTS

| | | |
|---|---|---|
| 4,104,700 A | 8/1978 | Hutchison et al. |
| 4,675,783 A | 6/1987 | Murase et al. |
| 5,412,535 A | 5/1995 | Chao et al. |
| 5,424,913 A | 6/1995 | Swindler |
| 5,568,360 A | 10/1996 | Penniman et al. |
| 5,598,320 A | 1/1997 | Toedtman et al. |
| 5,712,762 A | 1/1998 | Webb |
| 5,734,550 A | 3/1998 | Penniman et al. |
| 5,764,482 A | 6/1998 | Meyer, IV et al. |
| 5,784,256 A | 7/1998 | Nakamura et al. |
| 5,804,875 A | 9/1998 | Remsburg et al. |
| 5,822,187 A | 10/1998 | Garner et al. |
| 5,826,645 A | 10/1998 | Meyer, IV et al. |
| 5,847,925 A | 12/1998 | Progl et al. |
| 5,875,095 A | 2/1999 | Webb |
| 5,901,040 A * | 5/1999 | Cromwell et al. .......... 361/704 |
| 5,910,883 A | 6/1999 | Cipolla et al. |
| 5,926,370 A * | 7/1999 | Cromwell .................... 361/700 |
| 5,966,286 A | 10/1999 | O'Connor et al. |
| 6,102,110 A * | 8/2000 | Julien et al. ........... 165/104.33 |
| 6,125,035 A | 9/2000 | Hood, III et al. |
| 6,163,073 A * | 12/2000 | Patel .......................... 257/712 |

* cited by examiner

Primary Examiner—Darren Schuberg
Assistant Examiner—Anthony Q. Edwards
(74) Attorney, Agent, or Firm—Haynes and Boone, LLP

(57) ABSTRACT

A chassis includes a heat generating component. A base is mounted on the heat generating component. A plurality of heat pipes each have a first portion mounted in the base and a second portion extending from the base. A plurality of fins are mounted on the second portion of the heat pipes. The heat pipes are L-shaped and the first portion of each heat pipe is seated in a respective groove provided in the base.

22 Claims, 4 Drawing Sheets

MULTIPLE HEAT PIPE HEAT SINK

BACKGROUND

The disclosures herein relate generally to information handling systems and more particularly to cooling heat generating components used in such systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The need for high performance heat sinks is becoming more critical as component heat dissipations and heat densities are increasing in electronic components. This trend in increasing component heat dissipation is being countered by the need to cost reduce thermal solutions to reduce system cost. Present commodity heat sink solutions are reaching the point where they will not meet the performance requirements at the desired cost target. There is a clear need for a low cost, high performance, low pressure drop, high margin heat sink.

Therefore, what is needed is a thermal solution that provides a low-pressure drop and high heat density heat sink.

SUMMARY

One embodiment, accordingly, provides a cooling apparatus including a base, a plurality of heat pipes mounted in the base such that each heat pipe extends perpendicular to the base. A plurality of fins are mounted on the heat pipes.

A principal advantage of this embodiment is that a low-pressure drop and high heat density heat sink is provided which will meet the thermal and redundancy goals of present and future high heat density electronic components.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
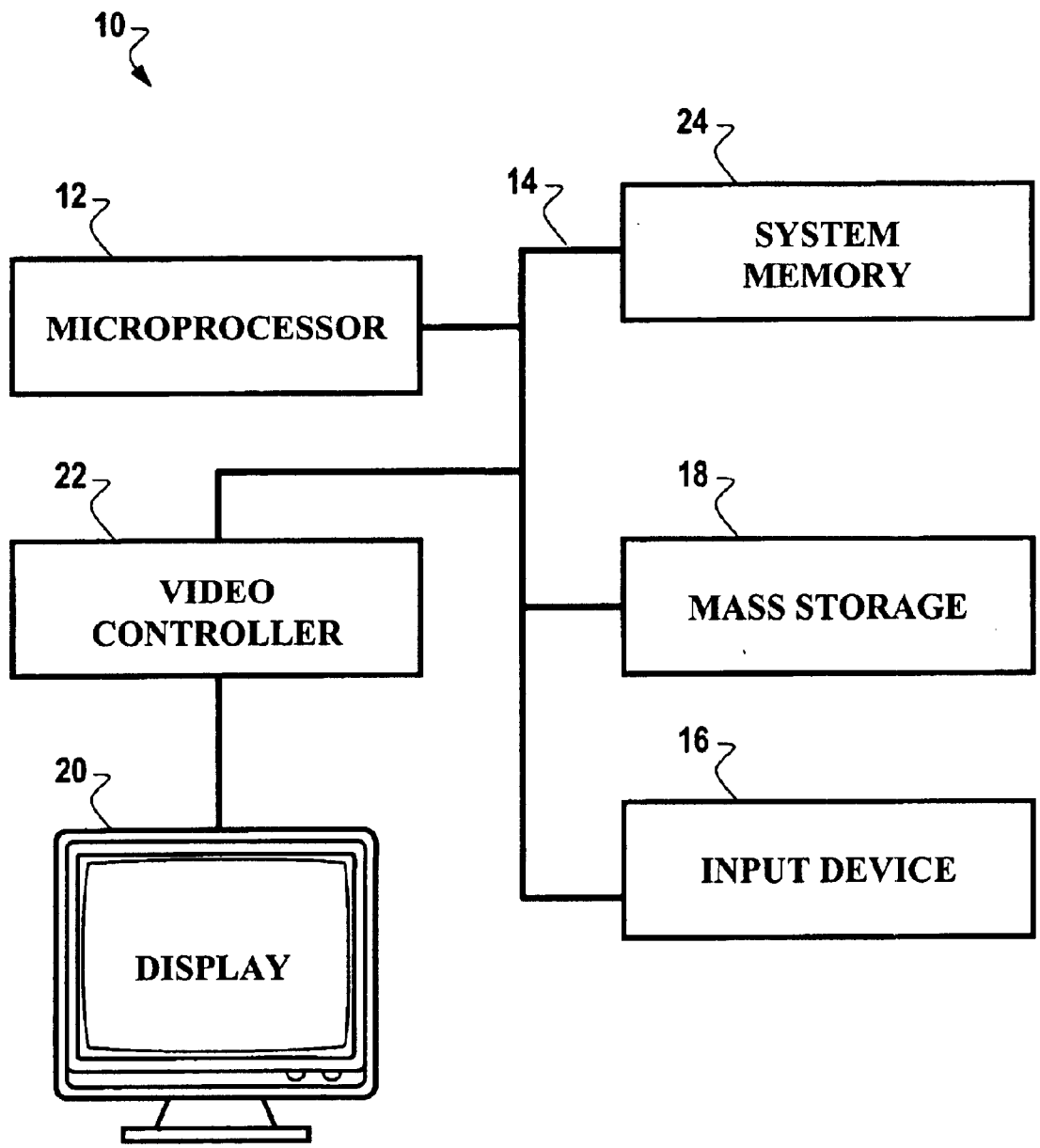
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
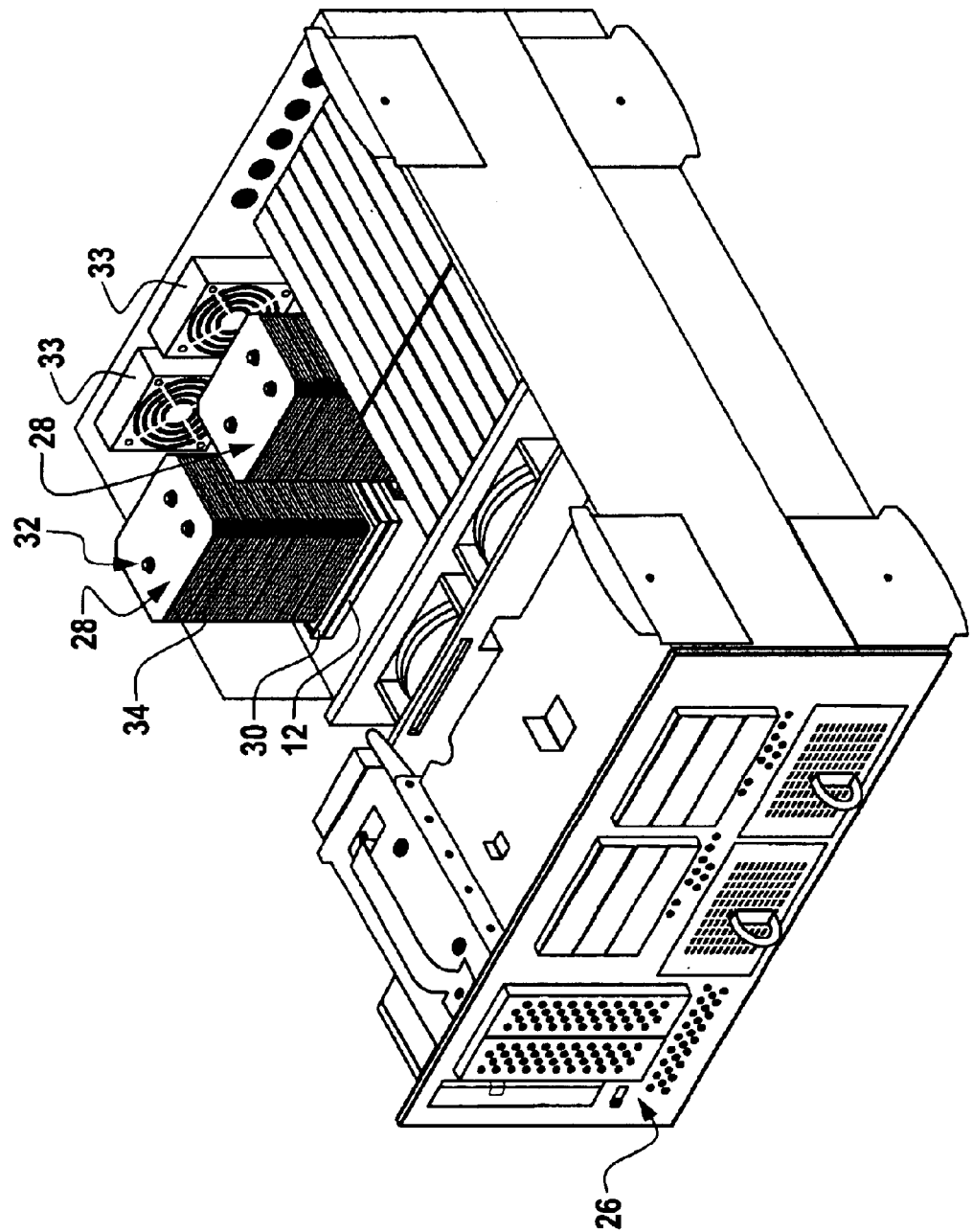
FIG. 2 is a perspective view illustrating an embodiment of a chassis having a heat sink mounted therein.
Figure 3:
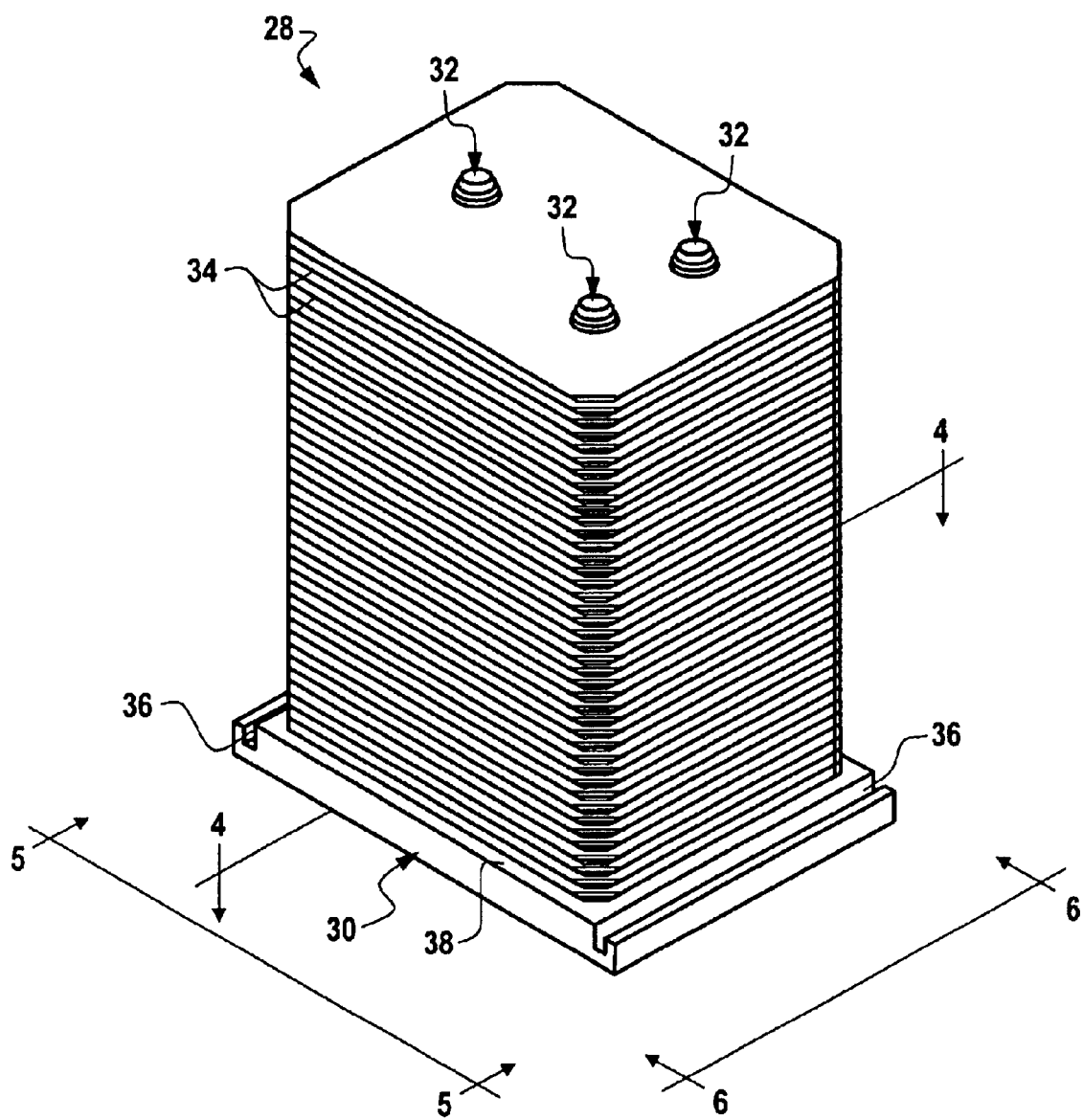
FIG. 3 is a perspective view illustrating an embodiment of a heat sink.

A chassis 26, FIG. 2, such as a computer chassis used in an information handling system, includes components, some of which are heat generating components including microprocessor 12. A heat sink 28 is mounted on microprocessor 12 to remove heat therefrom. A base 30 of the heat sink 28 is seated on and in contact with microprocessor 12. In FIG. 2, heat sinks 28 are assisted by redundant fans 33 for removing heat from chassis 26. The heat sink 28, FIG. 3, also includes a plurality of heat pipes 32 and a plurality of fins 34.

Base 30 is substantially rectangular and includes a pair of opposed clamping grooves 36 for engaging a clamp (not shown) which retains the heat sink 28 engaged with a positive force on the microprocessor 12. A surface 38 of base 30 includes a plurality of grooves 40, FIG. 4, formed therein. Grooves 40 are elongated and extend along the base 30 for receiving a portion of the heat pipes 32.

Figure 4:
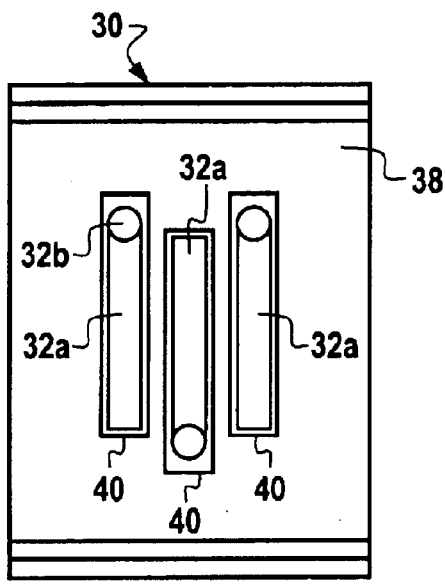
FIG. 4 is a plan view taken along the line 4—4 of FIG. 3.
Figure 5:
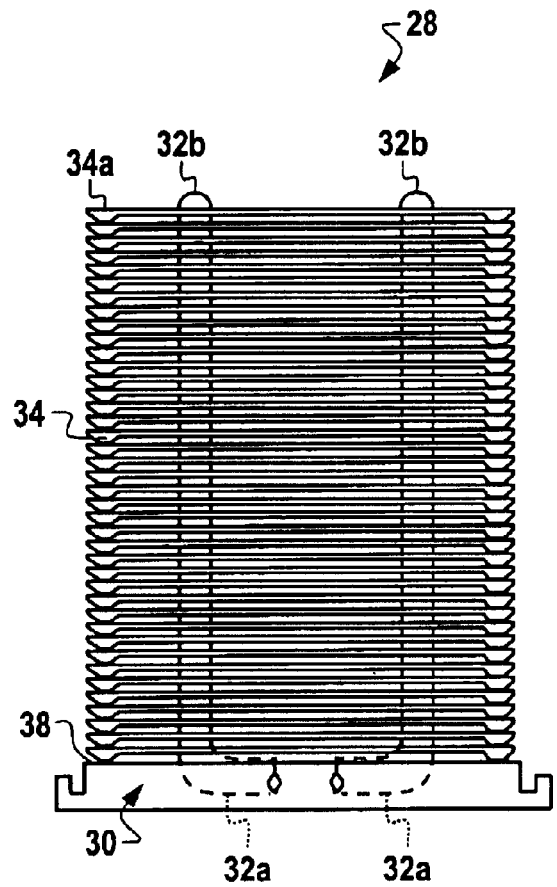
FIG. 5 is a side elevation view taken along the line 5—5 of FIG. 3.
Figure 6:
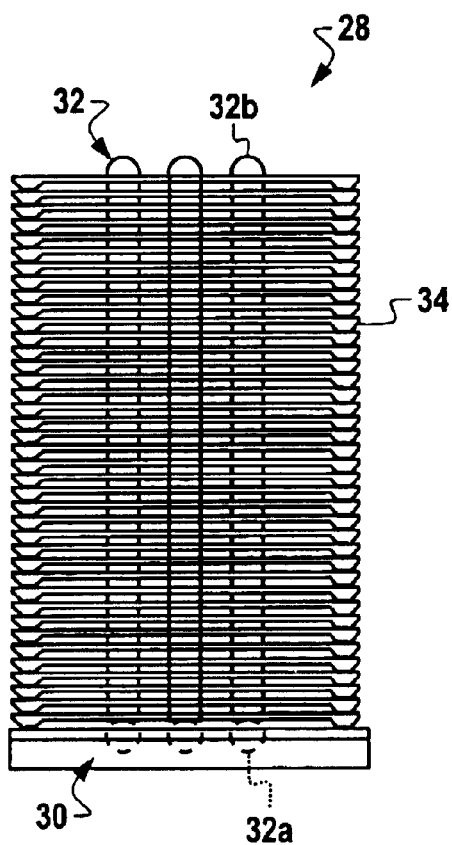
FIG. 6 is another side elevation view taken along the line 6—6 of FIG. 3.

Each heat pipe 32, FIGS. 4–6, is L-shaped having an elongated first portion 32a and an elongated second portion 32b. The first portion 32a of each heat pipe 32 seats in a respective groove 40. As such, the first portion 32a is substantially parallel to surface 38 of base 30. The second portion 32b of each heat pipe extends from base 30 and is perpendicular to surface 38. Also, each second portion 32b is substantially parallel to each other second portion 32b.

The fins 34 are substantially rectangular and are provided in a stacked, spaced apart configuration. Each fin 34 is preferably equally spaced apart from each other fin 34. Also, each fin 34 is substantially parallel to surface 38 and to each other fin 34. Further, each fin 34 extends substantially perpendicular to the second portion 32b of the heat pipes 32.

The materials used to form heat sink 28 are well-known, suitable materials for heat sink construction. Heat pipes 32 may be soldered or epoxy-attached to base 30. Also, fins 34 may be similarly attached to heat pipes 32. Spacing of the fins 34 is controllable by a fixture during manufacture. Preferably, each corner 34a of each fin 34 has an angled cut to remove a sharp portion of the fin 34.

This solution will provide a low-pressure drop and high heat density heat sink, which will meet the thermal and redundancy goals of present and future high heat density electronic components. This solution to the problem of a high performance heat sink with commodity pricing is a multiple heat pipe tower heat sink. This solution will use two or more heat pipes bent in an "L" shape with the heat pipes bent parallel to the base to aid in attachment to the base, and to improve thermal spreading from the heat source to the heat pipes. The heat transport path will be from the heat source, to the base, to the heat pipes, and to the fins perpendicular to the heat pipes. The use of multiple heat pipes will insure some level of redundancy due to either heat pipe failure or heat pipe dry out. The fin pitch (spacing) on the heat sink will be such that during fan fail, secondary (redundant) fans will be sufficient to meet component-cooling requirements.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cooling apparatus comprising:

a base having a peripheral surface, a heat contact surface and an opposed planar surface having surface openings formed therein, the openings extending into the base such that they are spaced from the heat contact surface;

a plurality of heat pipes including a first portion seated in the openings exposed adjacent to and extending substantially parallel to the opposed planar surface; and a plurality of fins mounted on a second portion of the heat pipes, each fin having a peripheral edge which does not extend beyond the peripheral surface of the base.

2. The apparatus as defined in claim 1 wherein the heat pipes are L-shaped, each heat pipe having a first portion imbedded in the base.

3. The apparatus as defined in claim 2 wherein each heat pipe includes a second elongated portion and each second portion extends from the base substantially parallel to each other second portion.

4. The apparatus as defined in claim 1 wherein each fin is spaced apart from each other fin, each fin being parallel to the base.

5. The apparatus as defined in claim 1 wherein each heat pipe is spaced apart from each other heat pipe.

6. The apparatus as defined in claim 5 wherein the fins extend perpendicular to the heat pipes.

7. The apparatus as defined in claim 1 wherein the heat pipes are fixedly attached to the base and the fins are fixedly attached to the heat pipes.

8. A chassis comprising:

a heat generating component mounted in the chassis;

a base having a peripheral surface, a heat contact surface mounted on the heat generating component and an opposed planar surface having surface openings formed therein, the openings extending into the base such that they are spaced from the heat contact surface;

a plurality of heat pipes having a first portion seated in the openings exposed adjacent to and extending substantially parallel to the opposed planar surface; and a plurality of fins mounted on a second portion of the heat pipes, each fin having a peripheral edge which does not extend beyond the peripheral surface of the base.

9. The chassis as defined in claim 8 wherein each heat pipe is spaced apart from each other heat pipe.

10. The chassis as defined in claim 9 wherein the fins extend perpendicular to the heat pipes.

11. The chassis as defined in claim 8 wherein the heat pipes are fixedly attached to the base and the fins are fixedly attached to the heat pipes.

12. The chassis as defined in claim 8 wherein the heat pipes are L-shaped and the first portion of each heat pipe is imbedded in the base.

13. The chassis as defined in claim 12 wherein each second portion extends from the base substantially parallel to each other second portion.

14. The chassis as defined in claim 8 wherein each fin is spaced apart from each other fin and parallel to the base.

15. An information handling system comprising:

a chassis;

a microprocessor mounted in the chassis;

a storage coupled to the microprocessor;

a base having a peripheral surface, a heat contact surface mounted on the microprocessor and an opposed planar surface having surface openings formed therein, the openings extending into the base such that they are spaced from the heat contact surface;

a plurality of heat pipes having a first portion seated in the openings exposed adjacent to and extending substantially parallel to the opposed planar surface; and a plurality of fins mounted on a second portion of the heat pipes, each fin having a peripheral edge which is substantially coextensive with the peripheral surface of the base.

16. The system as defined in claim 15 wherein the heat pipes are L-shaped, each first portion being imbedded in the base.

17. The system as defined in claim 15 wherein each second portion extends from the base substantially parallel to each other second portion.

18. The system as defined in claim 15 wherein each fin is equally spaced apart from each other fin, each fin being parallel to the base.

19. A method of cooling a component comprising:

providing a chassis;

mounting a heat generating component in the chassis;

mounting a base on the heat generating component;

providing the base with a peripheral surface, a heat contact surface mounted on the heat generating component and an opposed planar surface having surface openings formed therein, the openings extending into the base such that they are spaced from the heat contact surface;

mounting a first portion of a plurality of heat pipes in the openings exposed adjacent to and extending substantially parallel to the opposed planar surface; and mounting a plurality of fins on a second portion of the heat pipes.

20. The method as defined in claim 19:

wherein each fin has a peripheral edge which is substantially co-extensive with the peripheral surface of the base.

21. The method as defined in claim 20 further comprising:

forming each heat pipe in an L shape.

22. The method as defined in claim 21 further comprising:

extending each second portion substantially parallel to each other second portion.

* * * * *